No. 894,933. PATENTED AUG. 4, 1908.
C. A. BENSON.
LEVELING DEVICE.
APPLICATION FILED JAN. 23, 1908.

2 SHEETS—SHEET 1.

Witnesses

Inventor
Carl A. Benson
By C. A. Snow & Co.
Attorneys

No. 894,933. PATENTED AUG. 4, 1908.
C. A. BENSON.
LEVELING DEVICE.
APPLICATION FILED JAN. 23, 1908.
2 SHEETS—SHEET 2.
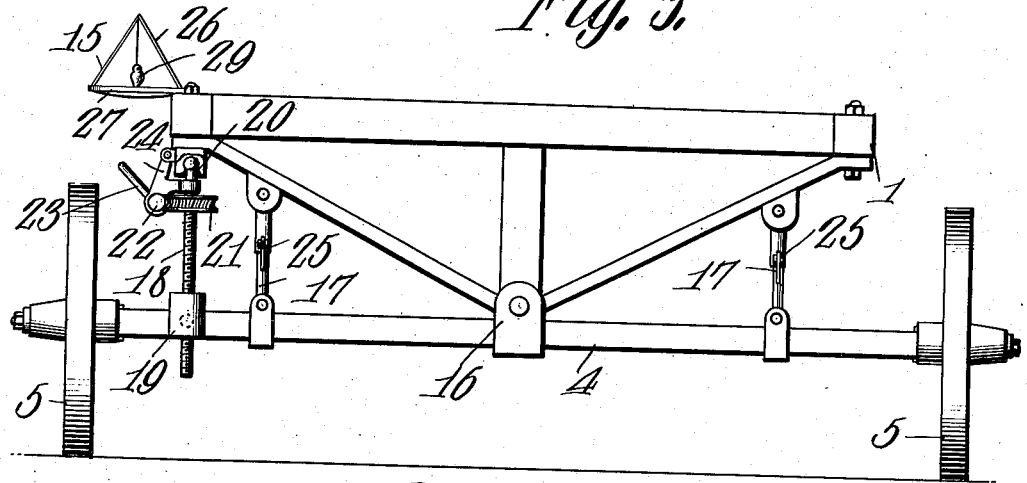
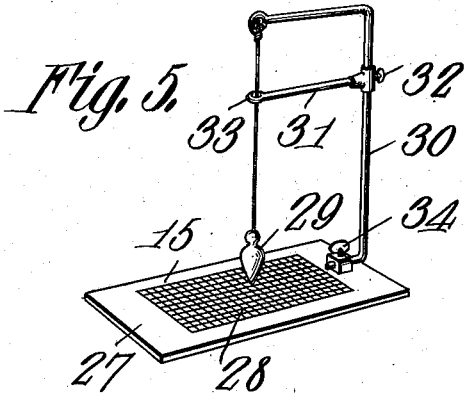
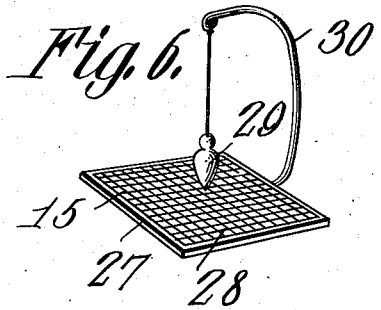
Carl A. Benson,
Inventor
Witnesses
By C. A. Snow & Co.
Attorneys

UNITED STATES PATENT OFFICE.

CARL ANTON BENSON, OF RED WING, MINNESOTA.

LEVELING DEVICE.

No. 894,933.     Specification of Letters Patent.     Patented Aug. 4, 1908.

Application filed January 23, 1908. Serial No. 412,319.

*To all whom it may concern:*

Be it known that I, CARL ANTON BENSON, a citizen of the United States, residing at Red Wing, in the county of Goodhue and State of Minnesota, have invented a new and useful Leveling Device, of which the following is a specification.

This invention has relation to leveling devices for threshers and similar machines and it consists in the novel construction and arrangement of its parts as hereinafter shown and described.

The object of the invention is to provide a simple and an effective means for leveling a thresher or similar machine upon uneven ground and it consists primarily of a means for turning an axle under the body or sills of the machine in such manner as to compensate for the uneven nature of the surface of the ground so that the axle may lie in a plane parallel with the surface of the ground while the body or sills of the machine will be level. An indicating means is mounted upon the body or sills and is intended to show when the said body or sills are in a level position.

Figure 1:
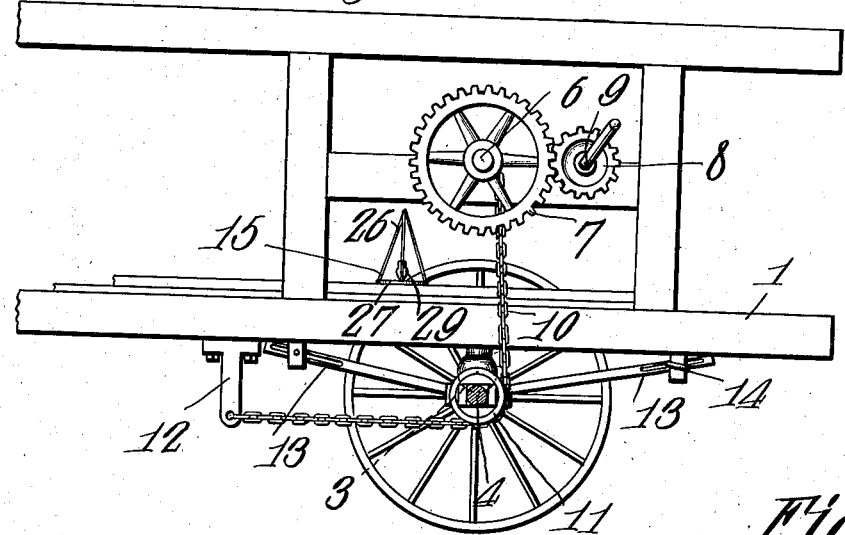
Figure 2:
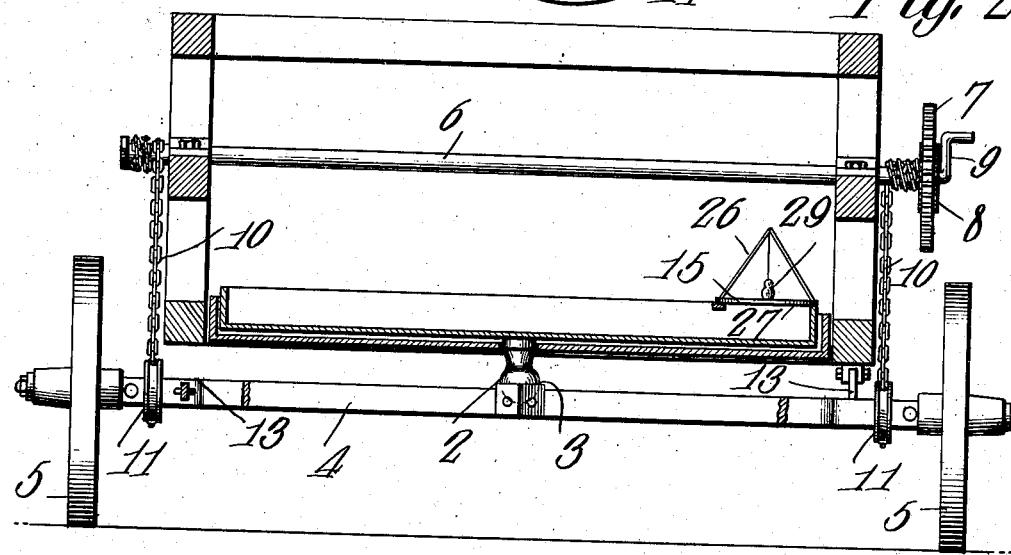
Figure 4:
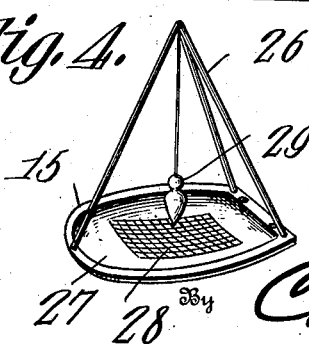

In the accompanying drawings: Figure 1 is a side elevation of a portion of a threshing machine with one wheel removed showing one form of the invention applied thereto. Fig. 2 is a transverse sectional view of a thresher showing the form of invention applied thereto as is illustrated in Fig. 1. Fig. 3 is an end elevation of a portion of another form of thresher showing a modified form of the invention applied thereto. Fig. 4 is a perspective view of one form of level indicator used upon the thresher. Fig. 5 is a detail perspective view of another form of level indicator, and Fig. 6 is a detail perspective view of still another form of level indicator.

In the form of the invention as shown in Figs. 1 and 2 the sills or body 1 of the machine are provided with a ball 2 which rests in a socket 3 mounted upon the axle 4. The ground wheels 5 are journaled upon the ends of the said axle. The shaft 6 is journaled for rotation upon the body 1 and extends transversely across the same. The gear wheel 7 is fixed to one end of the shaft 6 and meshes with a pinion 8 mounted upon the crank shaft 9. The chains 10 wind upon the end portions of the shaft 6 in opposite directions. Said chains pass under the wheels 11 loosely journaled upon the axle 4 and are attached at their forward ends to the standards 12 which depend from the body 1. The brace rods 13 lie upon opposite sides of the axle 4 and at the opposite ends thereof and are pivoted at their inner ends to the said axle and lie at their outer ends in the clamps 14 which are mounted upon the body 1. The level indicator 15 is mounted upon the body 1.

The device as above described is operated as follows: If it is desired to set the thresher in operative position upon uneven ground without digging or excavating pits for the reception of the wheels 5 the clamps 14 are loosened so that the braces 13 may slide longitudinally therein or the said braces may be disengaged from the clamps. The shaft 6 is then rotated through the instrumentality of the gear wheels 7 and 8 and crank shaft 9 and one of the chains 10 is wound upon the shaft 6 while the other chain 10 unwinds therefrom, thus, one side of the body 1 is drawn toward the axle 4 while the other side of the said body moves away from the axle. When the said body assumes a horizontal position the clamps 14 are tightened and the axle 4 is held in a plane parallel with the surface of the ground while the body 1 is supported in a horizontal position. The same effect is produced upon the body 1 by turning the axle 4 under the said body. The ball and socket members 2 and 3 will permit of such turning of the axle.

In the form of the invention as shown in Fig. 3 the body or sills 1 are supported upon the axle 4 by a pivotal connection 16. In this form of the invention the axle 4 cannot turn in a plane with relation to the body 1 but the said body may be tilted laterally upon the axle. In this form of the invention the slip joint braces 17 are interposed between the end portions of the axle and the sides of the body 1 and the said body is tilted laterally with relation to the said axle by means of the screw stud 18 which passes through the collar 19 mounted upon the axle 4 and is provided with a rounded upper end which lies in the socket 20 attached to the body 1. The worm wheel 21 is attached to the stud 18 and meshes with the worm 22 mounted upon the crank shaft 23. Said shaft is journaled for rotation in the bracket 24 which depends from the socket portion 20. In order to level the body 1 when equipped with the devices as shown in Fig. 3 the crank shaft 23 is rotated and the screw stud 18 is turned through the instrumentality of the worm 22 and worm wheel 21. Thus, the said stud is moved longitudinally through the collar 19 and the body 1 is tilted with relation to the axle 4. When the body 1 is in proper position with relation to the axle 4 the slip joint members of the braces 17 are secured together by clamp bolts 25 and thus the parts are held in their adjusted positions.

The level indicator 15 as shown in Figs. 1, 2, 3 and 4 consists of a tripod 26 mounted upon a plate 27. Said plate in turn is fixed with relation to the body 1 and is provided upon its upper surface with a series of graduation marks 28 which cross each other in parallel lines. The plumb bob 29 is suspended from the apex of the tripod 26 and when the body 1 is in level position the said bob 29 is directly above the intersections of the middle lines 28. When the said bob 29 is over any other lines or the intersections thereof it indicates that the body 1 is not level and the parts must be manipulated in order to cause the bob 29 to hang directly above the intersection of the middle lines 28. When the bob is in this position the body 1 is level irrespective of the position of the axle 4.

In the form of indicator as shown in Fig. 6 the standard 30 is detachably mounted upon the plate 27 and the bob 29 depends from the upper end of said standard. The guide arm 31 is slidably mounted upon the standard 30 and may be secured in an adjusted position thereon by the set screw 32. Said arm 31 is provided with an eye 33 which receives the line of the bob 29. By moving the arm 31 along the standard 30 toward the bob 29 the radius of movement of the said bob is reduced and consequently it cannot swing about to such an extent as to come in contact with obstructions. This means for holding the bob possesses its advantages while the machine is in transit and when the body 1 is being leveled the arm 31 is moved up so that the bob 29 may have a major swing. Also when in transit the standard 30 may be detached from the plate 27 by loosening the set screw 34.

The form of indicator as illustrated in Fig. 6 comprises a standard 30 permanently fixed to the plate 27 and the bob 29 hanging pendent from the upper end of the said standard.

Having described my invention, what I claim as new and desire to secure by Letters Patent is:

In combination with a body pivotally mounted upon an axle, a shaft journaled upon the body, chains oppositely wound upon the shaft and passing under the axle and being connected with the body, means for turning the shaft and longitudinally adjustable braces lying upon opposite sides of the axle and being connected at their inner ends with the axle and at their outer ends with the body.

In testimony that I claim the foregoing as my own, I have hereto affixed my signature in the presence of two witnesses.

CARL ANTON BENSON.

Witnesses:
   J. H. BOUSTEAD,
   NELS. SEVERSON.